United States Patent [19]
van Eekelen et al.

[11] 3,978,542
[45] Sept. 7, 1976

[54] WIPER ARM ASSEMBLY

[75] Inventors: Alex H. A. M. van Eekelen, Hasselt; Albert J. G. Hoebrechts, Bovelingen; Johan H. van den Berg, Hasselt, all of Belgium

[73] Assignee: Monroe Belgium N.V., Sint-Truiden, Belgium

[22] Filed: Apr. 29, 1974

[21] Appl. No.: 465,293

[52] U.S. Cl. .......................... 15/250.3; 15/250.17; 15/250.23; 15/250.34; 15/250.35
[51] Int. Cl.² ............................................ B60S 1/08
[58] Field of Search .......... 15/250.1, 250.16–250.42

[56] References Cited
UNITED STATES PATENTS

| | | | |
|---|---|---|---|
| 683,881 | 10/1901 | Kochenderfer et al. | 15/250.23 |
| 1,362,175 | 12/1920 | Oishei | 15/250.35 |
| 1,561,320 | 11/1925 | Glidric et al. | 15/250.29 |
| 1,584,821 | 5/1926 | Sparks | 15/250.30 |
| 1,608,985 | 11/1926 | McCaleb | 15/250.30 |
| 1,719,731 | 7/1929 | Schroder | 15/250.26 |
| 1,964,109 | 6/1934 | Cusset | 15/250.23 |
| 2,031,297 | 2/1936 | Anderson | 15/250.35 |
| 2,676,821 | 4/1954 | Reichelderfer | 15/250.35 |
| 2,744,282 | 5/1956 | Dyer et al. | 15/250.30 |
| 3,633,238 | 1/1972 | Parker | 15/250.30 |
| 3,837,032 | 9/1974 | Ulbrich | 15/250.23 |

FOREIGN PATENTS OR APPLICATIONS

| | | | |
|---|---|---|---|
| 543,635 | 3/1942 | United Kingdom | 15/250.20 |
| 1,095,590 | 2/1967 | United Kingdom | 15/250.30 |

*Primary Examiner*—Peter Feldman
*Attorney, Agent, or Firm*—Harness, Dickey & Pierce

[57] ABSTRACT

A wiper arm assembly is disclosed for use in operative association with a wiper blade and is adapted for typical, although not exclusive, application on vehicular windows, such as windshields, and rear and side windows. The wiper arm assembly of the present invention is operated by means of a drive motor which is located directly within the arm itself and is controlled by a plurality of electrical switches associated with a source of electrical energy, such as the vehicle battery. The assembly comprises inner and outer arm sections which are pivotably connected to one another and the aforementioned electrical switches are controlled by relative pivotal movement between the arm sections. One of the switches in the arm assembly functions to reverse the polarity of the electrical energy supplied to the drive motor, whereby to cause reverse rotation on the output shaft thereof and hence provide for oscillatory or reverse pivoting movement of the arm assembly. Another of the switches functions as a parking switch and permits the arm assembly to be parked or positioned out of registry with the operator's line of vision during such time as the arm assembly and associated wiper blade are not being used.

20 Claims, 7 Drawing Figures

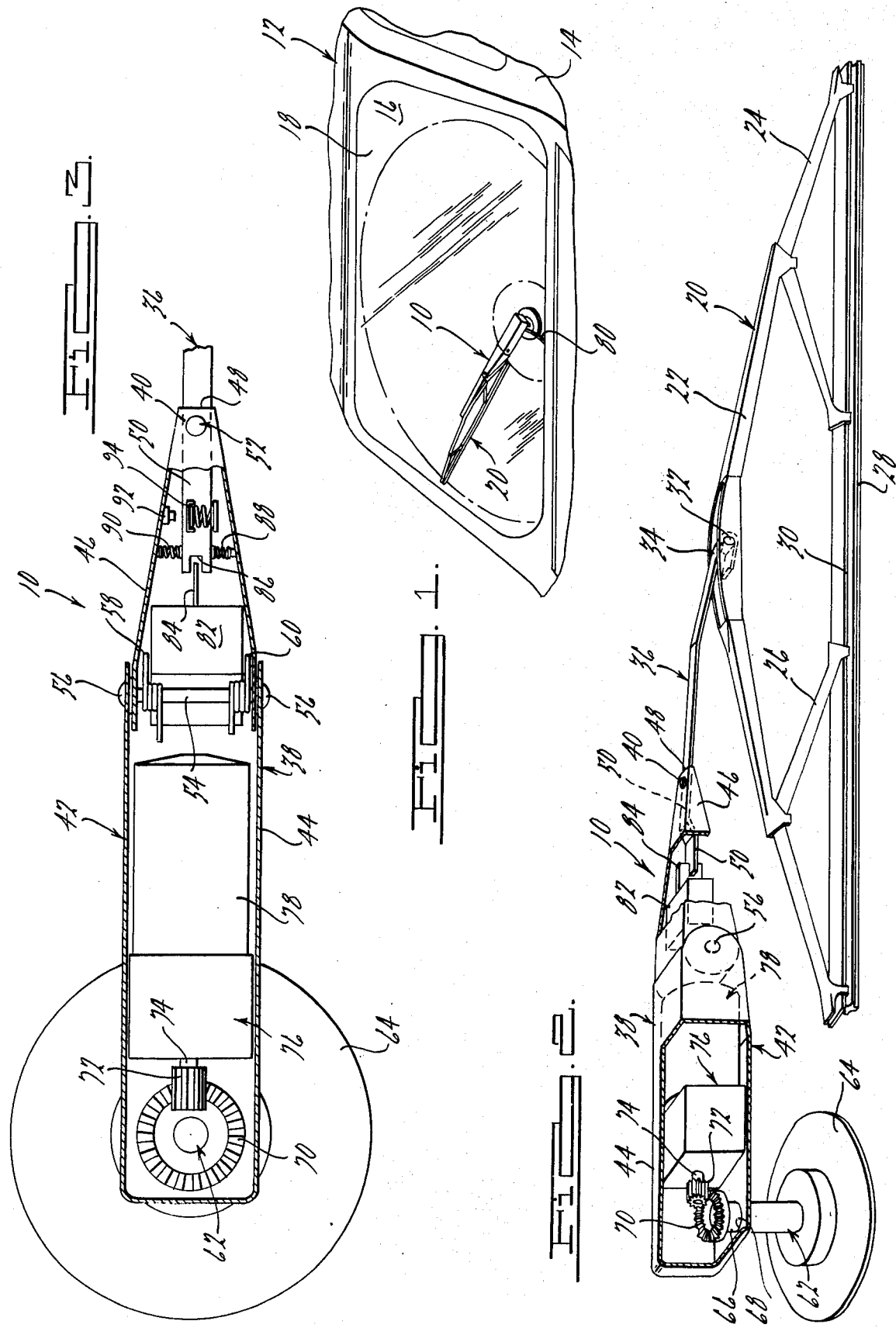

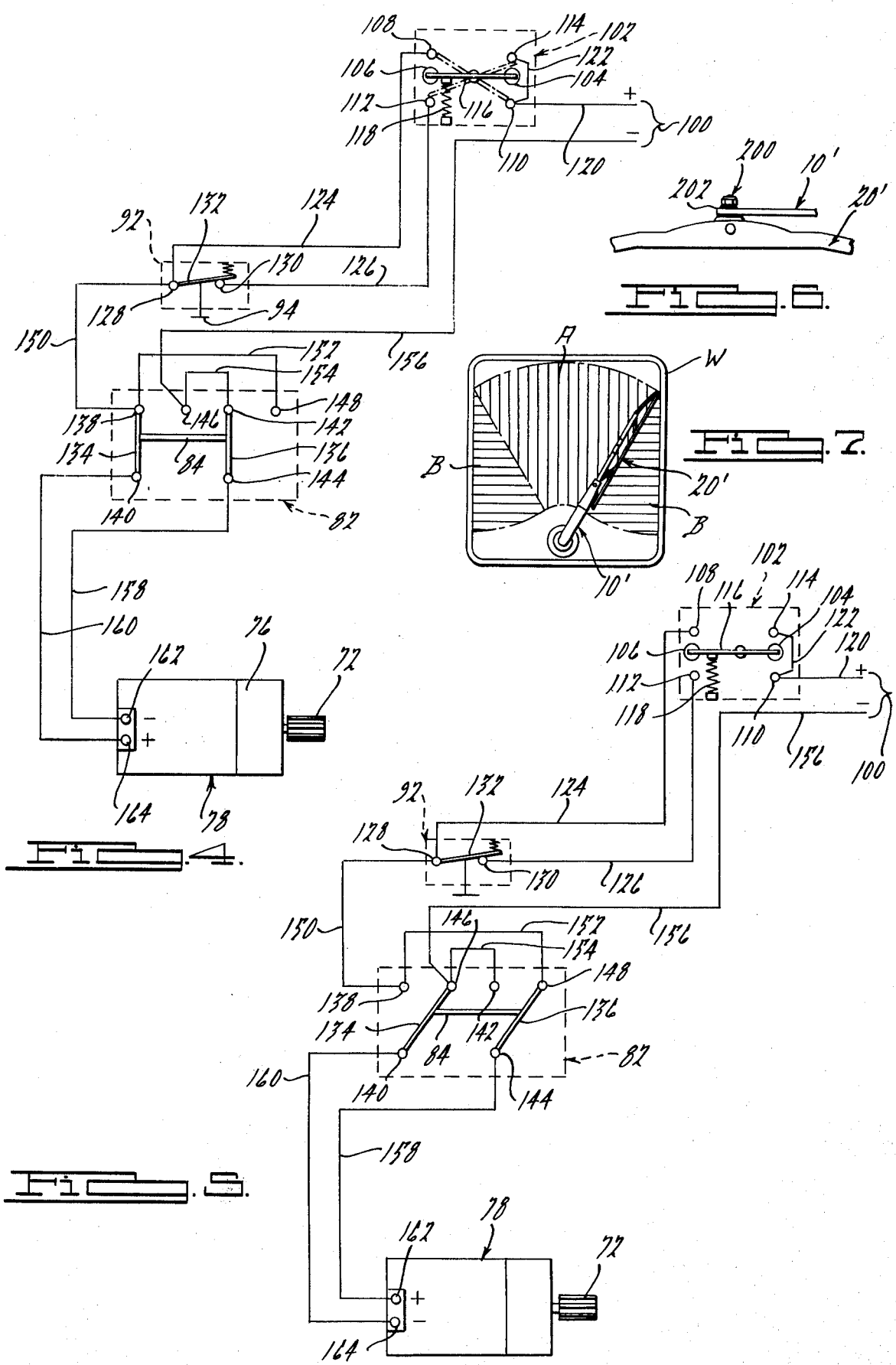

WIPER ARM ASSEMBLY

SUMMARY OF THE INVENTION

It has heretofore been the practice in the use of automotive vehicle windshield wiper arms to operatively mount the drive motor for the arm interiorly of the outer body shell. Typically, for a front windshield on a vehicle, the motor is mounted below the cowl and is operatively connected to one or more windshield wiper arms by means of a complicated arrangement of linkages, crankshafts, and related drive mechanisms. Such an installation, of course, necessitates providing one or more apertures or openings in the vehicle body in order to mount drive or pivot shafts which function in response to operation of the associated drive motor to cause pivotal movement of the wiper arm and associated wiper blades carried thereon. While front windshield wiper installations frequently do not result in a space problem, the use of such complicated mechanisms results in a relatively complicated assembly which is not only expensive to manufacture but requires continuous maintenance. For rear windshield installations, on the other hand, space may be critical, particularly in rear window installations for vehicles commonly known as station wagons. In such applications, the space available within the rear access door is extremely limited and considerable effort must be expended in order to achieve proper operation of the wiper arm. In either type of installation, the operational capability of the wiper arm and associated blade is limited by the geometry of the drive mechanism and it is usually the case that a particular drive mechanism can be used only on a certain type of vehicle or size windshield and a complete duplication of effort in designing a new drive mechanism and/or linkage arrangement is required for each additional type and size vehicle.

The present invention relates to a new and improved wiper arm assembly which obviates a number of the objectionable features of prior-known wiper arm designs. In particular, the wiper arm assembly of the present invention incorporates its drive motor directly within the arm assembly itself, thereby overcoming the need to drill or otherwise provide a hole in the vehicle chassis in order to provide for the transmission of motive power from an interiorly located drive motor to the exteriorly located wiper arm. Additionally, by locating the drive motor directly within the arm itself, the need for any complicated linkages and/or crankshafts, etc., is completely eliminated, thereby minimizing the number of component parts and maintenance requirements to the extreme. Another advantage of the present invention resides in the fact that through the provision of a novel switch arrangement which operates in response to preselected movement between certain sections of the arm structure, the arm may be made to accommodate virtually all sizes and types of windshield and/or window applications, thereby providing for universality of installation. Furthermore, actual installation of the present invention may be accomplished in an extremely simple manner by simply glueing or otherwise attaching a simple mounting plate directly to the windshield or adjacent portion of the vehicle body, thereby providing for rapid installation or removal when necessary for purposes of repair, or the like. It is accordingly a general object of the present invention to provide a new and improved wiper arm assembly which embodies the aforesaid features.

It is a more particular object of the present invention to provide a new and improved wiper arm wherein the drive motor therefor is built directly into the arm itself.

It is another object of the present invention to provide a new and improved wiper arm assembly for use in automotive vehicles and the like which may be conveniently mounted and removed without requiring the formation of openings or the like within the vehicle chassis, body, windshield, etc.

It is still another object of the present invention to provide a new and improved wiper arm assembly which is not limited in operation to the particular geometry of the associated drive linkage, but instead, the bounds or limits of operation thereof may be controlled solely by the peripheral rim of the associated window structure.

It is a related object of the present invention to provide a new and improved wiper arm construction which will automatically be adapted to various size window applications without requiring additional design of the drive means therefor.

It is still another object of the present invention to provide a new and improved wiper arm construction which has a built-in park mechanism, whereby the wiper arm will automatically be positioned out of alignment with the vehicle operator's field of vision when the same is not being used.

It is still another object of the present invention to provide a new and improved wiper arm assembly which assures against damage in the event either the arm or the associated blade becomes frozen or otherwise immovable relative to the associated window, thereby assuring against damage to the blade, arm, or drive means therefor.

It is still another object of the present invention to provide a new and improved wiper arm that will find universality of installation on virtually all types of vehicle windshield, windows, back lights and head lamps.

Other objects and advantages of the present invention will become apparent from the following detailed description taken in conjunction with the accompanying drawings.

BRIEF DESCRIPTION OF THE DRAWINGS

FIG. 1 is an elevated perspective view of the windshield wiper arm assembly of the present invention as shown in operative association with a typical automotive vehicle;

FIG. 2 is an enlarged elevated perspective view, partly broken away, of the assembly shown in FIG. 1;

FIG. 3 is a top elevational view of the actuating mechanism of the windshield wiper arm depicted in FIGS. 1 and 2;

FIGS. 4 and 5 are schematic representations of the electric circuitry embodied in the windshield arm of the present invention;

FIG. 6 is a fragmentary side elevational view of a slightly alternate embodiment of the present invention; and FIG. 7 is a view of a typical windshield having the embodiment of the present invention shown in FIG. 6 operatively associated therewith.

DETAILED DESCRIPTION OF THE PREFERRED EMBODIMENTS

Referring now in detail to the drawings and in particular to FIG. 1 thereof, a wiper arm assembly 10, in accordance with one preferred embodiment of the present invention, is shown in operative association with an automotive vehicle 12 including a chassis or body 14 within which is mounted a transparent window 16. The window 16 includes an outer surface 18 which, as well known in the art, may under certain operating conditions, have moisture and/or road dirt or the like accumulate thereon. The wiper arm assembly 10 is provided with a wiper blade 20 on the outer end thereof and is mounted relative to the window 16 such that the arm assembly 10 and blade 20 may pivot or oscillate back and forth in order to effect removal of the moisture and/or road dirt in a manner well known in the art. It will be noted that while the wiper arm assembly 10 of the present invention is described herein as being particularly associated with automotive vehicles and in particular windows thereof, the present invention is not intended to be so limited in that it may also be associated with a wide variety of different types of structures having interior and exterior sides and a surface which must be periodically cleaned and/or have moisture removed therefrom. It will also be noted that while the wiper assembly 10 of the present invention is shown in operative association with the rear or back light (window) of the vehicle 12, said assembly 10 may find wide and varied use with various other windows of a vehicle, such as the front windows (windshield) and/or side windows thereof.

The wiper blade 20 may be of any suitable construction and typically is shown as comprising an elongated bridge member 22 which is attached at the opposite ends thereof to a pair of yokes 24 and 26. The yokes 24, 26 are in turn connected to an elongated flexible wiper element 28 which is typically fabricated of a flexible wear-resistant rubber or the like and which is provided with an elongated flexor element 30 to which the ends of the yokes 24, 26 are attached. The upper central portion of the bridge 22 is provided with a cross pin or the like 32 to which a hook-shape outer end portion 34 of the wiper arm assembly 10 is operatively connected.

Generally speaking, the wiper arm assembly 10 includes inner and outer end sections 36 and 38, respectively, which are movable relative to one another in a manner hereinafter to be described. More particularly, the outer and inner end sections 36, 38 are pivotally connected to one another as seen at 40, whereby the outer end section 36 may be pivoted relative to the inner end section 38 for purposes later to be described. The inner end section 38 of the wiper arm assembly 10 includes a housing, generally designated by the numeral 42, which includes a generally rectangular cross-sectional portion 44 and a tapered portion 46, the latter of which is telescopically received within the adjacent end of the rectangular portion 44 in the manner best shown in FIG. 3. The outer end of the tapered portion 46 of the housing 42 is provided with an opening 48 through which the adjacent end of the outer end section 46 of the arm assembly 10 is received. Upon assembly of the wiper arm 10, an end portion 50 of the arm section 36 is disposed interiorly of the tapered portion 46 of the housing 42 with means, such as suitable pivot pin, rivet or the like, extending through the end sections 36 and 38, as seen at 40, in order to provide for the relative pivotal connection therebetween. As will be apparent, the opposite end of the outer end section 36 of the arm assembly 10 is provided with the aforementioned hook-shaped portion 34 which is operatively engageable with the cross pin 32 of the blade 20.

The tapered portion 46 of the housing 42 is adapted to be operatively connected to the generally rectangular portion 44 thereof by means of a transversely extending pivot shaft or axle, generally designated by the numeral 54, which extends through aligned bores on the opposite sides of the housing portions 44, 46 with the opposite ends of the shaft 54 being provided with enlarged diameter head portions 56. A pair of helical coil springs 58 and 60 are mounted coaxially of the shaft 54 adjacent the inner sides of the housing 42 and adapted to cause the tapered portion 46 of the housing 42 to be biased toward the associated outer surface 18 of the window 16, with the result that the wiper blade 20 will be positively engaged with the surface 18 to effect efficient removal of moisture and/or dirt thereon.

As best seen in FIGS. 2 and 3, the entire wiper arm assembly 10 is operably mounted upon or adjacent the window 16 by means of a pivot shaft, generally designated by the numeral 62. The lower end of the shaft 62 is fixedly secured to a generally disc-shaped mounting plate 64 which is intended to be secured by any suitable means, such as an adhesive, screw, bolts, or the like, directly to the window 16 or to an adjacent portion of the automotive vehicle chassis 14. The pivot shaft 62 includes an upper end 66 which projects through an opening 68 forming the underside of the housing 42, with the upper end 66 being provided with a suitable toothed gear element 70 which is cooperable with a meshing gear 72 mounted on the outer end of a drive or output shaft 74 of a speed-reducing mechanism or transmission, generally designated by the numeral 76. It will be seen that the shaft 74 extends generally longitudinally of the arm assembly 10, with the speed-reducing mechanism 76 being located interiorly thereof. The mechanism 76 is cooperable with an electrically energized drive motor 78 which is shown as being mounted within the housing 42 directly adjacent the mechanism 76. The drive motor 78 may be of any suitable construction and have any suitable coupling means operatively connecting the same with the speed reducing mechanism 76, whereupon energization of the motor 78 will result in rotation of the shaft 74 and gear 72, resulting in relative pivotal movement of the entire arm assembly 10 about an axis defined by the pivot shaft 62. The drive motor 78 is adapted to be connected with a suitable source of electrical energy, such as the vehicle battery, by means of suitable electrical conductors, as indicated by the numeral 80 in FIG. 1, with the motor 78 being of the type which operates to cause rotation of the output shaft thereof and hence rotation of the shaft 74 in one direction when the polarity of the voltage supplied thereto is in one condition and when the polarity of the electrical energy is reversed, rotation of the output shaft of the motor 78 and hence rotation of the shaft 74 is in the opposite direction, for purposes hereinafter to be described.

In accordance with the principles of the present invention, operation of the drive motor 78 is controlled by a directionally responsive control switch, generally designated by the numeral 82, which is mounted within the housing 42 directly outwardly from the shaft 54. The switch 82 includes an actuating arm 84 which projects outwardly from the switch 82 and is adapted to be nestingly received within a slot 86 formed within the end portion 50 of the outer end section 36 of the arm assembly 10. A pair of helical coil springs 88 and 90 are disposed on the opposite sides of the end portion 50 and extend outwardly therefrom to the laterally opposite sides of the tapered housing portion 46 as illustrated. The springs 88, 90 function to maintain the end portion 50 and hence the entire outer end section 36 of the arm assembly 10 generally longitudinally aligned with the longitudinal axis of the inner end section 38 of the arm assembly 10; however, during operation of the assembly 10, the outer end section 36 will be permitted to pivot about the pivot pin 52, whereupon the actuating arm 84 of the switch 82 will be selectively actuated, as will be described. In addition to the directionally responsive control switch 82, the drive motor 78 is also controlled by a parking switch, generally designated 92, that is mounted on the interior side of the tapered portion 46 of the housing 42. The parking switch 92 is adapted to be selectively actuated by means of a spring biased actuating button 94 which is carried upon the end portion 50 of the outer end section 36 of the arm assembly 10. Generally speaking, the switches 82 and 92 are intended to function in controlling the supply of electrical energy to the drive motor 78 such that the arm assembly 10 and hence the blade 20 attached thereto, will oscillate back and forth about a pivotal axis defined by the pivot shaft 62. A more detailed description of the operation of the switch 82 and 92 in conjunction with the drive motor 78 will now be given in connection with the schematic representation of the electric circuitry embodied in the present invention and as shown in FIGS. 4 and 5.

Referring now in detail to the electrical circuitry embodied in the wiper arm assembly 10 of the present invention and as best shown in FIGS. 4 and 5, said circuitry includes a remote control switch, generally designated by the numeral 102, which typically might be mounted on the dashboard or the like of the associated automotive vehicle 12 and which is operatively associated with a suitable source of electrical energy 100 which typically would be the battery of the vehicle 12. The switch 102 includes a pair of neutral terminals 104 and 106 and two pair of additional terminals 108, 110 and 112, 114. The switch 102 includes a manually actuatable armature 116 that is adapted to be manually actuated by the vehicle operator, for example. The armature 116 is spring biased by a suitable spring or the like 118 to a position wherein the neutral terminals 104 and 106 are engaged therewith; however, upon suitable actuation thereof, the armature 116 may be biased or pivoted in a clockwise direction to the phantom line position wherein a circuit is completed between the terminals 108 and 110, or alternatively, the armature 116 may be pivoted in a counterclockwise direction against the resistance of the spring 118 to a position wherein a circuit is completed between the terminals 112 and 114, as will hereinafter be described. The terminal 110 is connected to the source of electrical energy by means of a suitable conductor 120, while the terminals 110 and 114 are connected by another suitable conductor 122. The terminals 108 and 112 are connected via conductors 124 and 126, respectively, to a pair of terminals 128 and 130, respectively, within the parking switch 92. The terminals 128, 130 are adapted to be selectively interconnected by means of a suitable armature 132 which is actuatable by means of the aforementioned spring biased actuating button 94 on the end portion 50, thereby effecting parking of the arm assembly 10 in a manner hereinafter to be described.

With reference now to the directional control switch 82, as best seen in FIGS. 4 and 5, said switch 82 includes a pair of pivotable armatures 134 and 136 which are simultaneously actuatable by movement of the arm 84 in response to relative pivotal movement of the outer end section 36 of the arm assembly 10 relative to the inner end section 38 thereof. The armature 134 extends between and is adapted to communicate a pair of terminals 138 and 140 in the switch 82, while the armature 136 is adapted to extend between and communicate a similar pair of terminals 142 and 144. The switch 82 also includes two additional terminals 146 and 148. The terminal 138 is connected with the terminal 128 of the switch 92 via a conductor 150, and the terminal 138 is also connected to the terminal 148 via conductor 152. Terminals 146 and 142 are connected via conductor 154, with the terminal 146 also being connected to the source of electrical energy 100 via conductor 156. Terminals 144 and 140 are connected via conductors 158 and 160, respectively, with terminals 162 and 164, respectively, of the drive motor 78, thereby completing the electrical circuitry of the wiper arm assembly 10 of the present invention.

In operation, assuming that the dash-operated control switch 102 is in the position shown in FIG. 4 wherein the armature 116 extends between neutral terminals 106 and 104, the motor 78 will remain deenergized. At such time as it is desired to effect energization of the motor 78 and hence operation of the wiper arm assembly 10, the armature 116 is actuated (via a suitable control knob or the like) so as to rotate or pivot clockwise in FIG. 4 to a position wherein a circuit is completed via the armature 116 between terminals 108 and 110. When this is done, a circuit is completed between the source of electrical energy 100 and the drive motor 78, resulting in energization of the motor 78. In particular, a circuit is completed via conductor 120, terminal 110, armature 116, terminal 108, conductor 124, terminal 128, conductor 150, terminal 138, armature 134, terminal 140, and conductor 160, with the circuit being completed back to the source of energy 100 via conductor 158, terminal 144, armature 136, terminal 142, conductor 154, terminal 146, and conductor 156. Accordingly, the motor 78 will cause the gear 72 to effect pivotal movement of the entire wiper arm assembly 10 to a position wherein the wiper blade 20 engages some predetermined object, such as the side or bottom edge of the window 16. At such time as the blade 20 does, in fact, engage such an object, the outer end section 36 will be pivoted about the pivot point 40 and thereby cause the arm 84 of the switch 82 to be actuated. When this occurs, the armatures 134 and 136 will be pivotably biased from the position shown in FIG. 4 to the position shown in FIG. 5 where the armatures 134, 136 extend between terminals 140, 146 and 144, 148 respectively. Accordingly, the polarity of the electrical energy from the source 100 to the motor 78 will be reversed as a result of electrical energy being communicated between the source 100 and motor 78 through the following circuit: Electrical energy is communicated via conductor 120, armature 116, conductor 124, conductor 150, conductor 152, armature 136 and conductor 158 to the motor 78, with the circuit back to the source 100 being completed via conductor 160, armature 134, and conductor 156. Accordingly, the direction of rotation of the output shaft of the motor 78 will be reversed, causing reverse rotation of the gear 72 and hence the wiper arm assembly 10 will be pivoted in the opposite direction to a position wherein the blade 20 engages another object, such as the opposite side or bottom edge of the window 16. When this occurs, the outer end section 36 of the assembly 10 will be pivoted about the point 40 in the opposite direction to again move the arm 84 of the switch 82. Movement of the arm 84 will be in the opposite direction from that previously described and will result in the armatures 136 and 134 being pivotably biased from the position shown in FIG. 5 back to the position shown in FIG. 4, with the result that the first-mentioned electrical circuit will be completed to the motor 78 from the source 100. This first-mentioned circuit, of course, again reverses the polarity of the energy supplied to the motor 78, with the result that the output shaft of the motor 78 will be rotated in the opposite direction to cause reverse pivotal movement of the arm assembly 10 until such time as the blade 20 carried thereon engages the first-mentioned object to again repeat the cycle.

As will be appreciated, the motor 78 may be deenergized at any time by rotating the armature 116 from the dotted line position connecting the terminals 108, 110 to the neutral position wherein the armature 116 extends between the neutral terminals 104, 106. However, if it is desired to park the arm 10 at a position where the same is disposed adjacent the lower edge, for example, of the window 16, the armature 116 of the switch 102 is pivoted in a counterclockwise direction in FIG. 4 to a position wherein the armature 116 extends between and communicates terminals 114 and 112. Such movement of the armature 116 will be against the resistance of the spring 118 which functions to automatically bias the armature 116 back to the neutral position extending between the terminals 104, 106 when the armature 116 (or control knob therefor) is released by the vehicle operator. When the armature 116 is thus extending between the terminals 114 and 112, electrical energy from the source 100 is communicated via the conductor 126 and armature 132 to the conductor 150, with the armature 132 normally being closed under the influence of a suitable bias spring; however, at such time as the arm assembly 10 is pivotably biased under the influence of the drive motor 78 to a position wherein the blade 20 engages a preselected object, such as the bottom edge of the window 16, the outer end section 36 of the arm assembly 10 will be biased about the point 40, thereby causing the armature 132 to be moved out of engagement with the terminal 130 to open the circuit between the conductors 126 and 150. Accordingly, the drive motor 78 will be deenergized. As previously mentioned, the armature 116 of the switch 102 will automatically be returned to the neutral position when the same is released by the operator, and at such time as it is again desirable to initiate operation of the arm assembly 10, the armature 116 will be biased to the position extending between the terminals 108 and 110 whereupon the parking switch 92 will be circumvented since electrical energy will be conducted from the conductor 124 to the conductor 150. As soon as the motor 78 begins to move, the button 94 will permit the armature 132 to close so as to permit subsequent operation of the parking switch in the manner hereinabove described.

It should be noted that while the current to polarity-reversing circuitry hereinabove described is achieved by means of mechanically operated switches, rotating arm ends, springs and armatures, etc., such mechanical devices can be replaced by well-known electronic means, such as electronically operating multivibrator circuits, well known in the art. Such circuits typically operate in a manner so as to cause the current or polarity of the electrical energy supplied to the motor 78 to be reversed in response to a predetermined resistance being exerted upon the output shaft of the motor 78, as would occur when the blade 20 carried upon the arm assembly 10 engages an object, such as the edge of the associated window. Similarly, the parking switch 92 could be replaced by a multivibrator circuit, or various other well-known devices, such as a bi-metallic switch that would cause opening of a circuit in the event a predetermined resistance to rotation to the motor 78 were encountered. Additionally, various other types of mechanical devices could be used such as slip clutches or the like which would cause opening of the electrical circuit in the event a predetermined torque level was surpassed, as determined by either the pivot shaft 62 or various drive shafts operatively associated therewith.

It will be seen from the foregoing description that the present invention provides a normal windshield wiper arm assembly which embodies a number of features not provided in comparable type devices heretofore known and used. Among such features is the fact that the entire assembly can be conveniently mounted simply by gluing or otherwise securing the mounting plate 64 to the vehicle body and/or windshield so that it is not necessary to drill holes through the body to connect the wiper arm with an associated electric motor. Another important feature of the present invention resides in the fact that reverse movement of the wiper arm is not achieved through the use of conventional crankshaft driven mechanisms which use complicated linkages and the like, thereby substantially reducing the overall cost and time for installation. Additionally, the wiping arc of the arm assembly is not limited to the specific geometry of a certain linkage or crankshaft arrangement, but instead, may be controlled either directly by the dimensions of the window itself or by any suitable objects, i.e., abutments or the like, which may be placed on the windshield to effect reverse movement of the arm. That is, the wiper arm will normally move between two remote locations, such as opposed edges of the rim of the associated window; however, if it is desired to reduce the wiping arc, it is simply necessary to place some type of stop means upon the window against which the wiper arm or blade will engage to cause the reverse movement thereof. If the dimensions of the window are sufficiently large, and no obstacle is engaged by the arm or blade, a complete circle will be made; this will be particularly attractive when considering the potential application on vehicle headlights or the like.

Still another feature of the present invention resides in the fact that the parking mechanism may be operated to park the arm assembly in a position completely out of registry with the field of vision of the vehicle operator. In prior-known rear window wiper systems, for example, no parking mechanism have typically been used, with the result that the wiper arm can be parked only by deenergizing the associated drive motor and frequently this results in the wiper arm obstructing the vehicle operator's view.

Still another feature of the present invention resides in the fact that the wiper arm construction of the present invention has a built-in safety system. In prior type wiper assemblies heretofore known and used, the wiper blade and/or operating mechanism can easily be damaged in the event the wiper blade is, for example, frozen to the associated window surface. In the present construction, in the event the blade becomes frozen to the windshield, the switch 82 will sense that the arm assembly cannot move and the armatures 134, 136 will be switched back and forth between the positions shown in FIGS. 4 and 5 without causing damage to the wiper blade. At such time as the vehicle operator senses that the blade is not oscillating in response to his actuation of the control switch, such as the dash-operated switch 102, he can easily shut the system off and loosen the wiper blade, after which time the system will operate in a normal manner.

Referring now to FIGS. 6 and 7, a slightly modified embodiment of the present invention is shown wherein a wiper arm assembly 10' of substantially the same construction as the above-described assembly 10 is operatively connected to an associated wiper blade 20' in a manner so as to provide for relative rotational or pivotal movement therebetween. In particular, instead of the cross pin and hook arrangement shown in connection with the first-mentioned wiper arm assembly 10 and associated wiper blade 20, a pivot pin 200 is utilized which extends between the blade assembly 20' and the outer end of the wiper arm assembly 10'. As shown in FIG. 6, the pin 200 is arranged generally parallel to the associated shaft 62; that is, the pin 200 defines a pivotal axis parallel to the axis of the shaft 62. The pin 200 is adapted to permit the blade assembly 20' to be rotated or pivoted about the axis of the pin 200 relative to the blade assembly 10' and means in the form of a suitable spring washer 202 is provided between the underside of the arm assembly 10' and the adjacent surface of the bridge of the blade assembly 20' in order to provide for frictional resistance to such pivotal movement.

The advantage of the pivotal connection between the blade assembly 20' and the arm assembly 10' is best illustrated in FIG. 7 wherein the area designated by the reference A is the area of a windshield which would be cleaned or covered in the event a relatively rigid (non-pivotal) connection was provided between the blade assembly 20' and the wiper arm assembly 10'. By providing for pivotal movement between the blade assembly 20' and arm assembly 10', the wiper blade 20' will not only cover the area A but also covers the areas B as the arm assembly 10' oscillates or pivots back and forth across the window representatively designated by the indicia W. Accordingly, a considerably greater area of the window W will be serviced or cleaned by the windshield wiper arm 10' of the present invention when the pivotal connection is provided between the outer end thereof and the associated blade assembly, such as the assembly 20' mentioned above. Such an advantage is possible, of course, due to the fact that reverse pivotal movement of the arm assembly 10' is not achieved by means of a conventional crankshaft and/or mechanical drive mechanism, but instead, reverse pivotal movement is achieved or effected by having the wiper blade engage the periphery of some other stop located adjacent to the opposite side edges of the window W.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:
1. In a wiper arm construction for use in pivotably biasing a wiper blade back and forth across an associated surface relative to a preselected pivotal axis,
   means supporting said arm for said pivotal movement, and
   drive means for causing said pivotal movement of said arm, said drive means comprising an electrically energized drive motor mounted on and movable with said arm relative to said pivotal axis.

2. The invention as set forth in claim 1 wherein said drive motor is operable in a first mode to cause said arm to pivot in a first direction relative to said axis towards a first location and is operable in a second mode for causing said arm to pivot in the opposite direction relative to said axis toward a second location, and which includes electrical switching means responsive to preselected movement of said arm to change the mode of operation of said drive motor from one mode of operation thereof to the other.

3. In a wiper arm construction for use in moving the wiper blade relative to an associated surface,
   means supporting one end of said arm whereby the opposite end thereof may oscillate about a pivotal axis back and forth between two spaced-apart locations, an electrically energized drive motor mounted on said arm and having a rotatable drive shaft and operable in a first mode to cause said shaft to rotate in one direction and thereby cause one end of said arm to move in a first direction toward one of said locations, and operable in a second mode to cause said shaft to rotate in the opposite direction and thereby cause said one end of said arm to move in a second direction toward the other said locations, and
   electrical switching means responsive to preselected pivotal movement of said arm to change the mode of operation of said drive motor from one mode of operation thereof to the other and thereby change the direction of rotation of said drive shaft.

4. The invention as set forth in claim 3 wherein said arm has first and second relatively movable parts, which includes a source of electrical energy for energizing said motor, connecting means for operatively connecting said source with said motor, and means responsive to preselected relative movement between said parts for actuating said switching means and thereby switching the mode of operation of said motor from one mode thereof to the other.

5. In a wiper arm construction for use in pivotably biasing a wiper arm back and forth across a surface relative to a pivotal axis,
   said arm having first and second relatively movable sections,
   means supporting said arm whereby one end thereof is movable back and forth between two spaced locations,
   an electrically energizable drive motor operable in a first mode to cause said arm to move toward one of said locations and operable in a second mode to cause said arm to move toward the other of said locations,
   a source of power for said drive motor and connecting means operatively connecting said source with said motor, and electrical switching means and means responsive to preselected movement between said sections for altering the connection between said source of power and said drive motor and thereby switching the mode of operation of said motor from one mode thereof to the other.

6. The invention as set forth in claim 5 wherein said wiper arm construction is adapted to move a wiper blade across a surface defined by a structure having first and second sides with said surface being located on the first side of the structure, and wherein said means supporting said arm for pivotal movement includes attachment means located entirely on the first side of said structure.

7. In a wiper arm construction for use in moving the wiper arm across a surface,
means supporting one end of said arm whereby the opposite end thereof oscillates between two spaced locations,
an electrically energized reversible drive motor for causing said arm to oscillate between said locations, said motor being mounted on and movable with said arm relative to a pivotal axis,
a source of electrical energy and means for communicating said source with said motor, and
switch means operable to vary said means for communicating said source with said motor so as to effect reversing of said motor.

8. The invention as set forth in claim 7 wherein said drive motor includes a drive shaft which is cooperable with a pivot shaft arranged generally coaxially of said pivotal axis and secured against pivotable movement.

9. A wiper arm construction for use in moving a wiper blade across a surface defined by a structure having first and second sides, said surface being located on the first side of the structure,
means supporting said arm for pivotal movement relative to said surface, and attachment means for operatively securing said supporting means and said arm to said structure,
said attachment means being located entirely on the first side of said structure,
said wiper arm comprising first and second generally longitudinally aligned sections and means connecting adjacent ends of said arm sections for pivotal movement relative to one another,
said supporting means supporting one end of said arm whereby the opposite end thereof may be oscillated back and forth between two spaced-apart locations,
drive means operable in a first mode to cause one end of said arm to move in the first direction toward a first location and operable in a second mode to move said one end of said arm toward a second location, and
means responsive to preselected relative movement between said arm sections to change the mode of operation of said drive means from one mode of operation thereof to the other.

10. The invention as set forth in claim 9 wherein said drive means includes a reversely rotatable drive shaft cooperable with a non-rotatable pivot shaft secured to an associated support structure.

11. A wiper arm construction for use in moving a wiper blade across a surface defined by a structure having an exterior and an interior, with said surface being located on the exterior side of said structure, means supporting said arm for pivotal movement relative to said surface, and an electrically energized drive motor mounted on said arm for causing back and forth pivotal movement of said arm relative to said structure,
said drive motor being located entirely between said means supporting said arm and said wiper blade.

12. The invention as set forth in claim 11 wherein said drive motor comprises an electrically energized drive motor for causing said arm to be biased relative to said surface, means drivingly connecting said motor with said arm and including a relatively rotatable and a relatively non-rotatable drive shaft, and wherein the rotatable drive shaft is located entirely on the exterior side of a structure defining said surface, whereby said arm may be mounted on the exterior of said structure without requiring that any means be provided to transmit driving power for said arm between the exterior side of the structure and the opposite interior side thereof.

13. A wiper arm construction for use in moving a wiper blade across a surface,
means supporting said arm for pivotal movement, an electrically energized drive motor mounted on and pivotally moveable with said arm for causing said arm to be pivotally biased relative to said surface, and
a relatively rotatable drive shaft mounted on said arm and pivotally moveable in its entirety with said arm, said shaft drivingly connecting said drive motor with said means supporting said arm.

14. The invention as set forth in claim 13 wherein said wiper arm comprises first and second generally longitudinally aligned sections, means movably connecting adjacent ends of said arm sections together, means supporting one end of said arm whereby the opposite end thereof may be oscillated back and forth between two spaced-apart locations, wherein said drive motor is operable in a first mode to cause one end of said arm to move in a first direction toward one of said locations and is operable in a second mode to move said one end of said arm toward the other of said locations, and which includes electrical switching means responsive to preselected movement between said arm sections to change the mode of operation of said drive motor from one mode of operation thereof to the other.

15. In a wiper arm construction for use in pivotably biasing a wiper arm back and forth across a surface defined by a structure having an exterior and an interior with said surface being located on the exterior of said structure,
an electrically energized drive motor for causing said arm to be biased relative to said surface, said motor being mounted on and pivotably movable with said arm,
means drivingly connecting said motor with said arm including relatively rotatable and non-rotatable drive elements,
said rotatable drive element being located entirely on the exterior of said structure, whereby said arm may be mounted on the exterior of said structure without requiring any means be provided for transmitting driving power for said arm between the interior and exterior, or vice versa, of said structure.

16. A wiper arm construction for use in pivotably biasing a wiper blade back and forth across an associated surface relative to a pivotal axis,
said wiper arm comprising first and second sections, means pivotally connecting adjacent portions of said arm sections together, means supporting one end of said arm whereby the opposite end thereof may oscillate back and forth between two spaced-apart locations, an electrically energized drive motor mounted on and pivotable with said arm, said motor being operable in a first mode to cause said one end of said arm to move in a first direction to one of said locations and operable in a second mode for causing said one end of said arm to move in a second direction toward the other of said locations, and electrical switching means responsive to preselected movement between said arm sections to change the mode of operation of said drive motor from one mode of operation thereof to the other.

17. The invention as set forth in claim 1 which includes parking means for deenergizing said drive motor when said arm is in a preselected position relative to said surface.

18. The invention as set forth in claim 3 wherein said arm comprises first and second relatively movable sections, and parking means for deenergizing said drive motor in response to preselected movement of one of said sections relative to the other thereof.

19. The invention as set forth in claim 5 which includes, first switch means for reversing operation of said motor in response to preselected movement of said arm, second said switch means for causing deenergization of said drive motor when said arm is in a preselected position, and control means actuatable to a first condition wherein said first switch controls operation of said drive motor and actuatable to a second position wherein said second switch means controls operation of said drive motor.

20. A combination wiper arm and wiper blade assembly comprising, means supporting said assembly for pivotal movement about a predetermined axis, said arm having first and second articulated sections, connecting means for operatively connecting said arm sections and including means providing for relative pivotal movement between said arm sections about an axis substantially parallel to said first mentioned axis, and an electrically energized drive motor mounted on one of said arm sections and pivotable with said arm about said first mentioned axis.

* * * * *